United States Patent [19]

Namizuka

[11] Patent Number: 5,331,427
[45] Date of Patent: Jul. 19, 1994

[54] IMAGE REPRODUCING APPARATUS

[75] Inventor: Yoshiyuki Namizuka, Yokohama, Japan

[73] Assignee: Ricoh Company, Ltd., Tokyo, Japan

[21] Appl. No.: 878,335

[22] Filed: May 4, 1992

[30] Foreign Application Priority Data

May 8, 1991 [JP] Japan .................................. 3-131901

[51] Int. Cl.⁵ ............................................ H04N 1/415
[52] U.S. Cl. ...................................... 358/433; 358/432
[58] Field of Search ............... 358/455, 433, 142, 400, 358/426, 462, 467

[56] References Cited

U.S. PATENT DOCUMENTS

| | | | |
|---|---|---|---|
| 4,237,484 | 12/1980 | Brown et al. ........................ | 358/142 |
| 5,051,840 | 9/1991 | Watanabe et al. .................. | 358/433 |
| 5,101,438 | 3/1992 | Kanda et al. ........................... | 382/9 |

*Primary Examiner*—Stephen Brinich

*Attorney, Agent, or Firm*—Mason, Fenwick & Lawrence

[57] ABSTRACT

An image reproducing apparatus includes an input part for inputting digital signals indicating an image and for inputting supplementary digital signals, a composition part for coding the digital signals through a prescribed coding process so as to generate a matrix of blocks in which coded data described by coefficients produced through the coding process is contained, the blocks being arranged in two-dimensional coordinates depending on a level of a frequency corresponding to each of coded digital signals, a first control part for determining a first region of low-frequency blocks in which the coded data corresponding to the digital signals are substantially located within the matrix, and a second control part for placing allocation data defining a location of the first region within the matrix into a maximum-frequency block of the matrix, and for placing data corresponding to the supplementary digital signals into a second region of high-frequency blocks of the matrix.

17 Claims, 10 Drawing Sheets

IMAGE REPRODUCING APPARATUS

BACKGROUND OF THE INVENTION

The present invention relates generally to an image reproducing apparatus, and more particularly to an apparatus for reproducing an image by coding supplementary digital signals together with image signals through a transform coding process, the apparatus having capabilities of inputting and outputting digital signals for carrying out a text/image composition process and a text/image separation process.

Conventionally, there is a technique for coding a supplementary digital signal together with an image signal so as to compress the range of data to a narrower range, and for decoding the resulting combined signal. The image signal can be a facsimile signal which exhibits a high degree of correlation. The digital signal can represent any other data which is independent of the image signal. For example, U.S. Pat. No. 4,237,484 discloses such a technique. There is also a text/image composition technique for combining text data with a halftone image signal by using a prescribed discrete orthogonal transform process. In this technique, a redundant portion of image data produced after the transform process is performed is replaced by the text data, the resulting image data containing the text data being encoded into coded information which have a form of a matrix of blocks in orthogonal transform coordinates. The redundant portion, which includes frequency components produced when the transform coding process is performed, is used for combining the text data with the halftone image data, and only a small quantity of text data can be combined with the halftone image data without seriously degrading the picture quantity.

However, in the above mentioned techniques, no preprocessing of the supplementary digital signals is performed, and the quantity of the digital signals to be combined with the image signals is limited and not reduced to a narrower range so that a large quantity of supplementary digital signals cannot be combined with the image signals without degrading the picture quality. Thus, there is a problem in that it is difficult to reproduce an image containing a large quantity of text data combined with image signals without seriously degrading the picture quality.

SUMMARY OF THE INVENTION

Accordingly, it is a general object of the present invention to provide an improved image reproducing apparatus in which the above described problems are eliminated.

Another, more specific object of the present invention is to provide an image reproducing apparatus in which a suitable preprocessing of supplementary digital signals is carried out and in which adaptive quantization is carried out for each block of the matrix of coded picture elements based on an activity level of the image data, thus reproducing a high-quality composite image with a large quantity of supplementary information such as text data and voice data. The above mentioned object of the present invention is achieved by an image reproducing apparatus which includes an input part for inputting digital signals indicating an image and for inputting supplementary digital signals, a composition part for coding the digital signals through a prescribed coding process so as to generate a matrix of blocks in which coded data described by coefficients produced through the coding process is contained, the blocks being arranged in two-dimensional coordinates depending on a level of a frequency corresponding to each of coded digital signals, a first control part for determining a first region of low-frequency blocks in which the coded data corresponding to the digital signals is substantially located within the matrix, and a second control part for placing allocation data defining a location of the first region within the matrix into a maximum-frequency block of the matrix, and for placing data corresponding to the supplementary digital signals into a second region of high-frequency blocks of the matrix.

Still another object of the present invention is to provide an image reproducing apparatus which can easily and reliably produce digital signals indicating text data separated from a composite image reproduced by the above mentioned apparatus with no need for considering the existence of a large quantity of text information. The above mentioned object of the present invention is achieved by an image reproducing apparatus which includes an input part for inputting a matrix of blocks corresponding to the composite image, the matrix of blocks containing coded data described by coefficients produced through a prescribed coding process, the blocks being arranged in two-dimensional coordinates depending on a level of a frequency of each of coded data corresponding to the composite image, a first transform part for detecting a location of a second region of low-frequency blocks in which coded data corresponding to the supplementary data is located within the matrix by checking allocation data at a maximum-frequency block of the matrix, a separation part for separating the matrix of the blocks, in accordance with the detected location of the second region, into a first region of high-frequency blocks in which coded data corresponding to image data in the composite image is located and the second region in which the coded data corresponding to the supplementary data is located, and a second transform part for carrying out inverse transform coding of the coded data corresponding to the image data, the coded data located in the first region of the matrix, so as to output an image of the resulting data separately from the composite image.

According to the present invention, it is possible to allow a large quantity of supplementary digital signals indicating text data or voice data to be combined with digital signals indicating image data without seriously degrading the picture quality, thus reproducing a high-quality composite image. The quantity of the supplementary data combined with the image data can be varied. Also, the existence of a large quantity of supplementary digital signals combined with the digital image signals is not necessary to be considered, and this feature is useful for reproducing a composite image of a confidential document.

Other objects and further features of the present invention will become more apparent from the following detailed description when read in conjunction with the accompanying drawings.

DESCRIPTION OF THE PREFERRED EMBODIMENTS

Figure 1A:
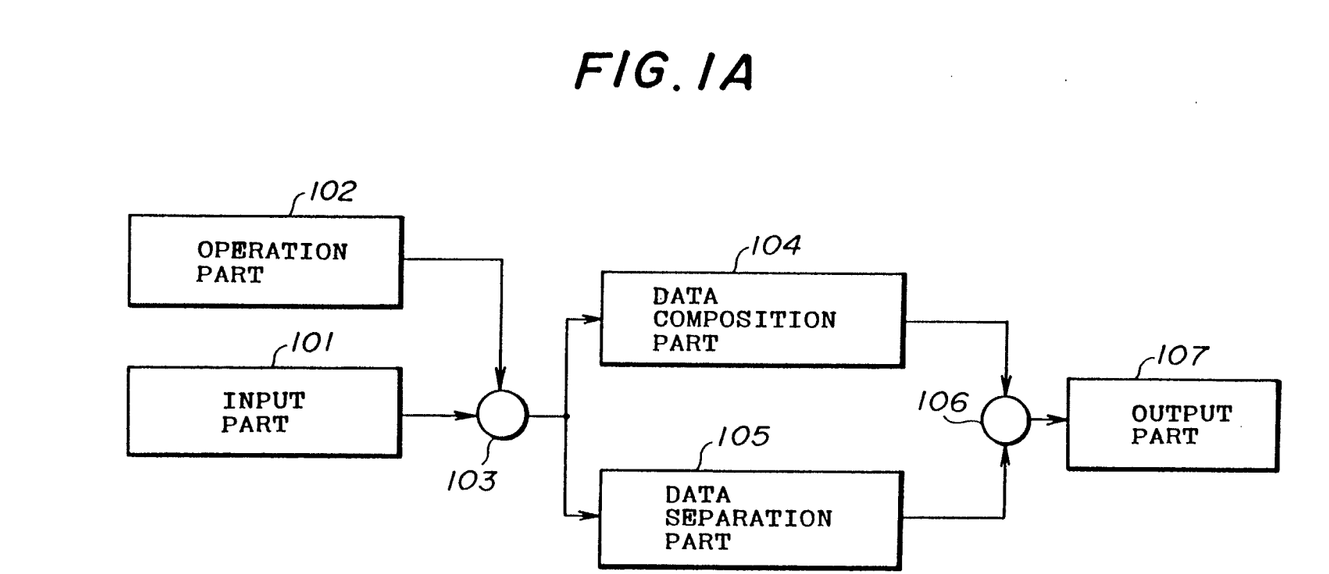
FIGS. 1A, 1B and 1C are block diagrams showing embodiments of image reproducing apparatuses according to the present invention.

A description will now be given of an embodiment of an image reproducing apparatus according to the present invention. FIG. 1A shows the construction of this image reproducing apparatus. In FIG. 1A, this apparatus includes an input part 101 for inputting a digital signal indicative of an image from a document reader or a supplementary digital signal indicative of text information from a storage device such as a floppy disk unit, an operation part 102 for inputting an instruction requesting that whether a data composition process or a data separation process be performed with the input digital data supplied by the input part 101, a data composition part 104 for carrying out a text/image data composition in which the supplementary digital signal is combined with the image signal, both supplied by the input part 101 through prescribed coding, a data separation part 105 for carrying out a text/image data separation in which the added text data is extracted or separated from the combined image data, and an output part 107 for outputting such data from either the data composition part 104 or the data separation part 105 so that the output data is printed or supplied an external storage device. The output part 105 may include a printer and a storage device as described below.

A switch part 103 switches connection of the input part 101 to either the data composition part 104 or the data separation part 105, in accordance with the instruction by the operation part 102, so as to supply the digital signal to either the data composition part 104 or the data separation part 105. A switch part 106 switches connection of either the data composition part 104 or the data separation part 105 to the output part 107, so that the data for which a selected image processing is carried out is supplied to the output part 107. In the above described image reproducing apparatus, the data from the input part 101 is selectively supplied to either the data composition part 104 or the data separation part 105 via the switch part 103 in accordance with the instruction by the operation part 102. After the data composition process or the data separation process is carried out for the input signals, the processed data is supplied to the output part 107 via the switch part 106. Thus, supplementary digital signals can be combined with digital image signals through the text/image data composition process, and the supplementary signals can be extracted from the combined signals through the text/image data separation process. It should be noted that the present invention is not limited to the use of the supplementary digital signals indicating text data, and that the present invention is also applicable to supplementary digital signals generated from voice data by carrying out necessary processes.

Figure 10:
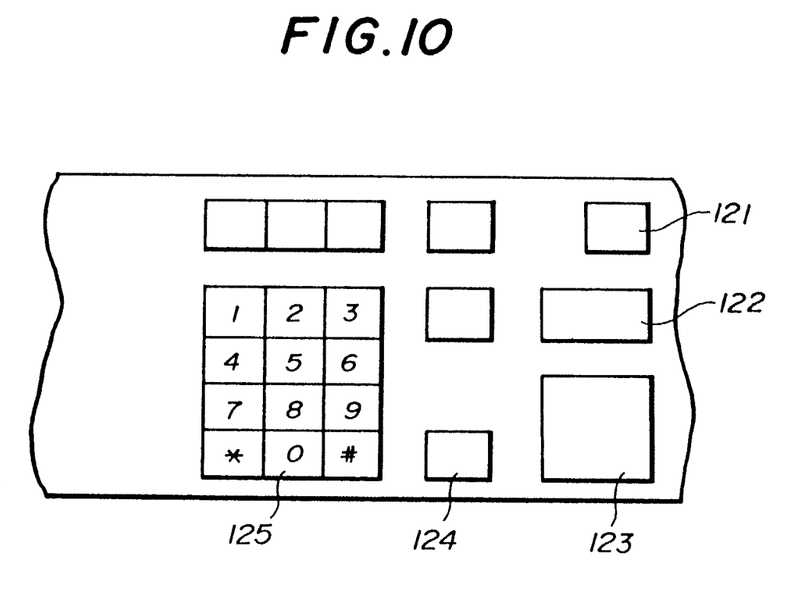
FIG. 10 is a view showing an example of an operation part in the image reproducing apparatus.

FIG. 10 shows an example of the operation part 102 of FIG. 1A. This operation part is formed with a set of control keys on a control panel of an image forming system. In this operation part, a switch key 121 is depressed to change an operating mode between dynamic mode and high-speed mode, a switch key 122 is depressed to select an operating process between the data composition process and the data separation process, and a start key 123 is depressed to start operation of the image forming system. Also, a clear/stop key is used when a setting number of copies is changed or a copy repeat mode is interrupted, and a ten key 125 is used to input a desired number of copies being reproduced. The function of the operation part 102 in the image reproducing apparatus of FIG. 1A is achieved by depressing the switch key 122.

Figure 1B:
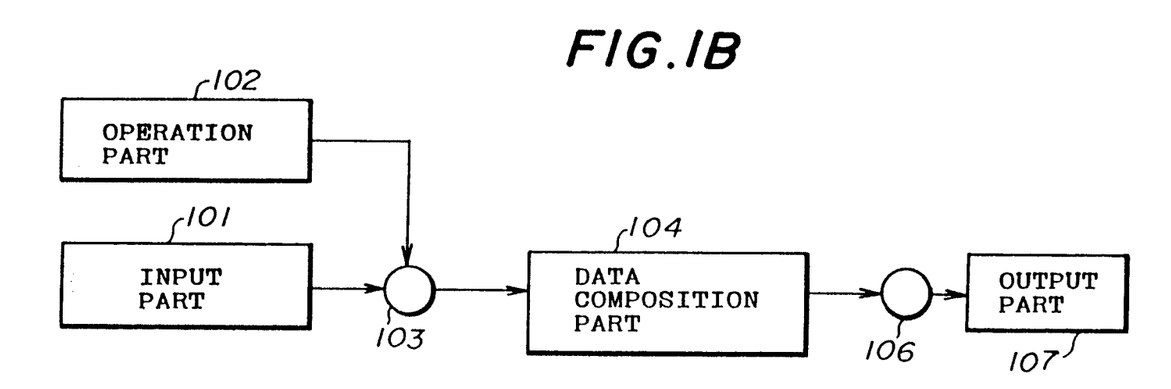
Figure 1C:
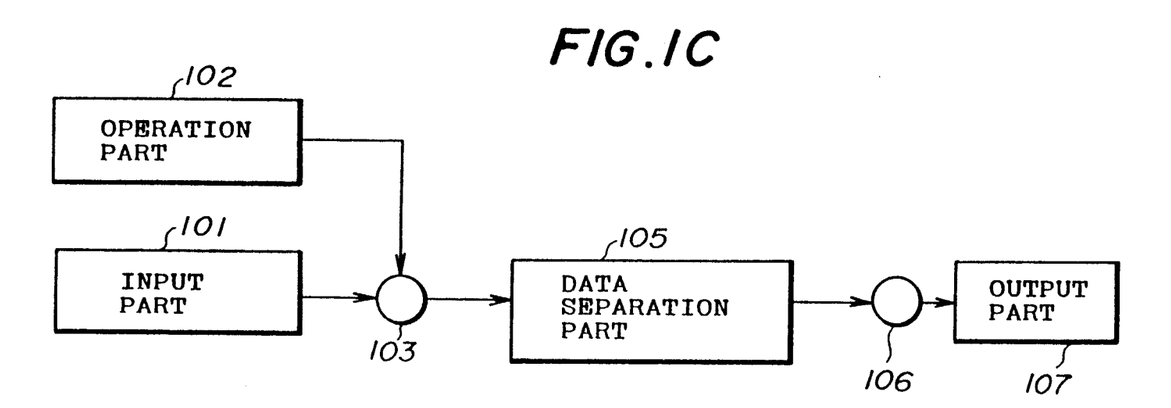

FIG. 1B shows another embodiment of the image reproducing apparatus, and in this embodiment the data composition part 104 is selected according to the instruction. In this embodiment, the input part 101 is connected to the data composition part 104 via the switch part 103, and the data composition part 104 is connected to the output part 107 via the switch part 106 so that the above text/image data composition is achieved. Also, FIG. 1C shows still another embodiment of the image reproducing apparatus, and in this embodiment the data separation part 105 is selected according to the instruction. In this embodiment, the switch part 103 connects the input part 101 to the data separation part 105, and the switch part 106 connects the data separation part 105 to the output part 107 so that the above text/image data separation is achieved.

Figure 2:
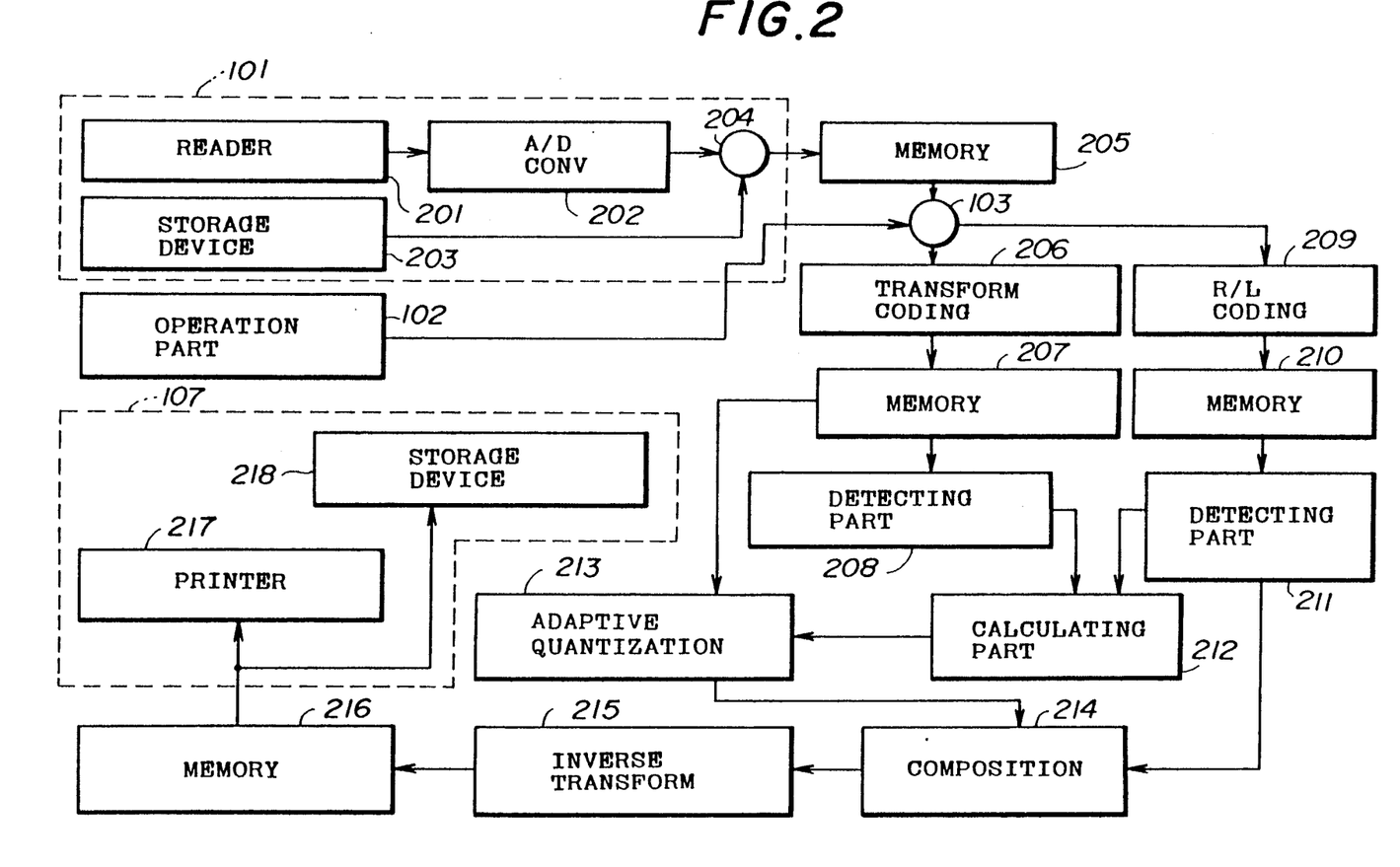
FIG. 2 is a block diagram showing the construction of a data composition part.

FIG. 2 shows a detailed structure of the data composition part provided in the image reproducing apparatus of the present invention. In FIG. 2, the input part 101 includes a reader 201 optically reading a document containing image data or text data and generating an analog signal indicative of the document data by photoelectrical conversion of a readout signal, an A/D (analog-to-digital) converter 202 generating a digital signal indicative of the document data from the analog signal supplied by the scanner 201, a storage device 203 storing a digital signal indicative of image data or text data in a floppy disk or the like, and a switch part 204 switching connection of the A/D converter 202 and the storage device 203 to the input of the data composition part 104. A memory 205 stores the digital signal supplied by the input part 101.

As shown in FIG. 2, the data composition part includes a transform coding part 206, a memory 207 and a detecting part 208. The transform coding part 206 carries out orthogonal transform coding of the digital signal of the image data supplied by the input part 101 so that transform coefficients for each of blocks of the coded picture elements are generated together with a matrix of blocks of coded picture elements. The memory 207 stores the transform coefficients together with the matrix of blocks of the coded picture elements supplied by the transform coding part 206. The detecting part 208 detects the quantity of the transform coefficients for a total of the input picture elements stored in the memory 207.

The data composition part of the invention basically also includes a run-length coding part 209 binarizing the digital signal of text data by a prescribed run-length coding method to generate a sequence of run-length codes from the digital signal, a memory 210 storing the run-length codes for a total of the input text data, and a detecting part 211 detecting the quantity of the run-length codes for a total of the input text data. Based on the detected quantity of the transform coefficients for a total of the input image data from the detecting part 208 and based on the detected quantity of the run-length data for a total of the input text data from the detecting part 211, a calculating part 212 calculates a compression rate of the picture elements required for the text data to be inserted into a remaining vacant region other than the compressed image data after a prescribed adaptive quantization is carried out.

In FIG. 2, a quantization part 213 carries out adaptive quantization for each block in the coded picture elements stored in the memory 207, in accordance with a suitably assigned bit rate. The quantized image data supplied by the quantization part 213 forms a compressed image data in which the compression rate required for the text data to be inserted in the remaining vacant regions other than the image data is achieved. A composition part 214 carries out a data composition process in which the coded text data from the detecting part 211 is combined with the compressed image data from the quantization part 213, thereby transform coefficients of the combined data. An inverse-transform coding part 215 carries out inverse-transform coding based on the transform coefficients supplied by the composition part 214, so that a composite image in which the text data is combined with the image data is reproduced. A memory 216 stores the composite image supplied by the inverse-transform coding part 215. Also, in FIG. 2, the output part 107 includes a printer 217 for printing the data of the composite image from the memory 216 and a storage device 218 storing and retaining the composite image data from the memory 216.

Figure 3:
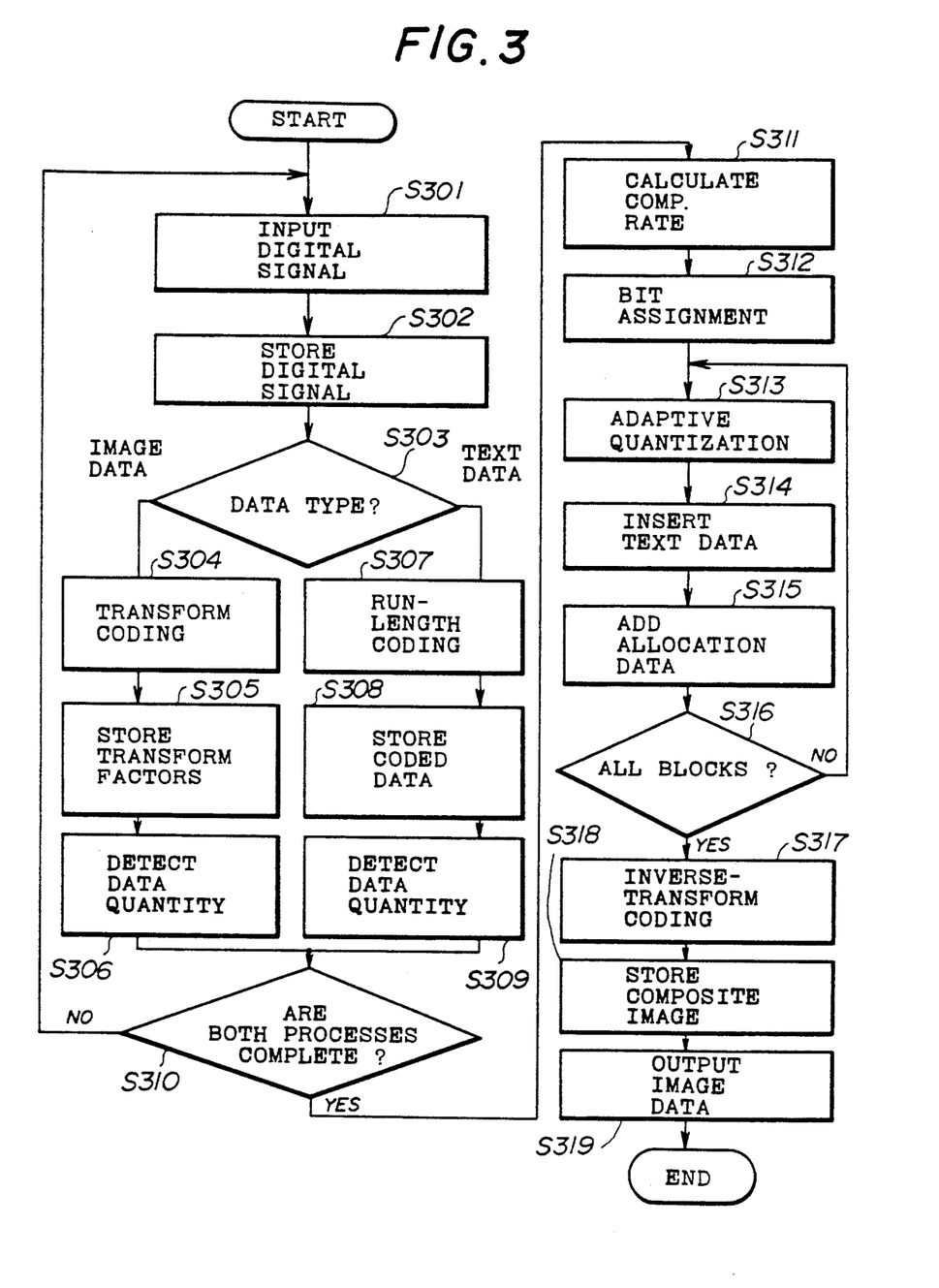
FIG. 3 is a flow chart for explaining a text/image composition process performed by the data composition part.

FIG. 3 shows a text/image composition process performed by the data composition part of FIG. 2. In a flow chart shown in FIG. 3, step S301 inputs a digital signal which is supplied from either the reader 201 or the storage device 203 via the switch part 204, and step S302 stores the digital signal in the memory 205. Step S303 checks whether the input signal stored in the memory 205 indicates text data or image data. When it is detected in step S303 that a digital signal indicating image data is input, a transform coding process for the image data is carried out by the transform coding part 206 in step S304. In step S305, the resulting transform coefficients are stored in the memory 207. Then, in step S306, the quantity of data of the transform coefficients for a total of the image data is detected by the detecting part 208.

When it is detected in step S303 that a digital signal indicating text data is input, step S307 carries out a run-length coding process for the text data by means of the run-length coding part 209. In step S308, the coded signal is stored in the memory 210. Then, in step S309, the quantity of the coded text data is detected by the detecting part 211.

Step S310 detects whether or not both the transform coding process and the run-length coding process for the two types of information is completed. Steps S301 through S309 are repeated until both processes are completed for a total of the input digital signal. After it is detected in step S310 that both processes are completed, in step S311, the calculating part 212 calculates a compression rate of the picture elements required to insert the text data in the compressed image data, based on the quantity of the transform coefficients for the total of the image data from the detecting part 208, and based on the quantity of the coded text data from the detecting part 211. Also, in step S312, an average coding rate for the coded picture elements is determined, and a suitable, different bit rate is assigned to each of the blocks of the matrix of the coded picture elements, based on the determined average coding rate and based on the a.c. component of electric power with respect to transform coefficients of each block.

In step S313, the quantization part 213 carries out adaptive quantization for each block of the matrix of the coded picture elements stored in the memory 207 in accordance with the assigned bit rate so that the data is compressed so as to achieve the required compression rate. In step S314, the coded text data is inserted into vacant blocks due to the data compression for reproducing a composite image. In step S315, allocation data defining a location of the coded image data is inserted to the matrix of the coded picture elements at a block representing a component of maximum frequency due to the adaptive quantization. Step S316 checks whether or not the steps S313 to S315 are repeated until the above described process is completed for all the blocks of the coded picture elements.

After the above described process is completed, in step S317, the inverse-transform part 215 carries out inverse-transform coding process based on the transform coefficients supplied by the composition part 214, so that a composite image is reproduced. In step S318, the composite image supplied by the inverse-transform coding part 215 is stored in the memory 216. In step S319, the stored composite image in the memory 216 is output by the output part 107.

Accordingly, the preprocessing of text data and the adaptive quantization based on the transform coefficients or based on the activity of image data allow a large quantity of text data in different quantities to be combined with image data without seriously degrading the picture quality, thus reproducing a high-quality composite image. The existence of a large quantity of supplementary digital signals being combined with image signals is not necessary to be considered, and this feature is useful for reproducing an image of a confidential document.

Figure 4:
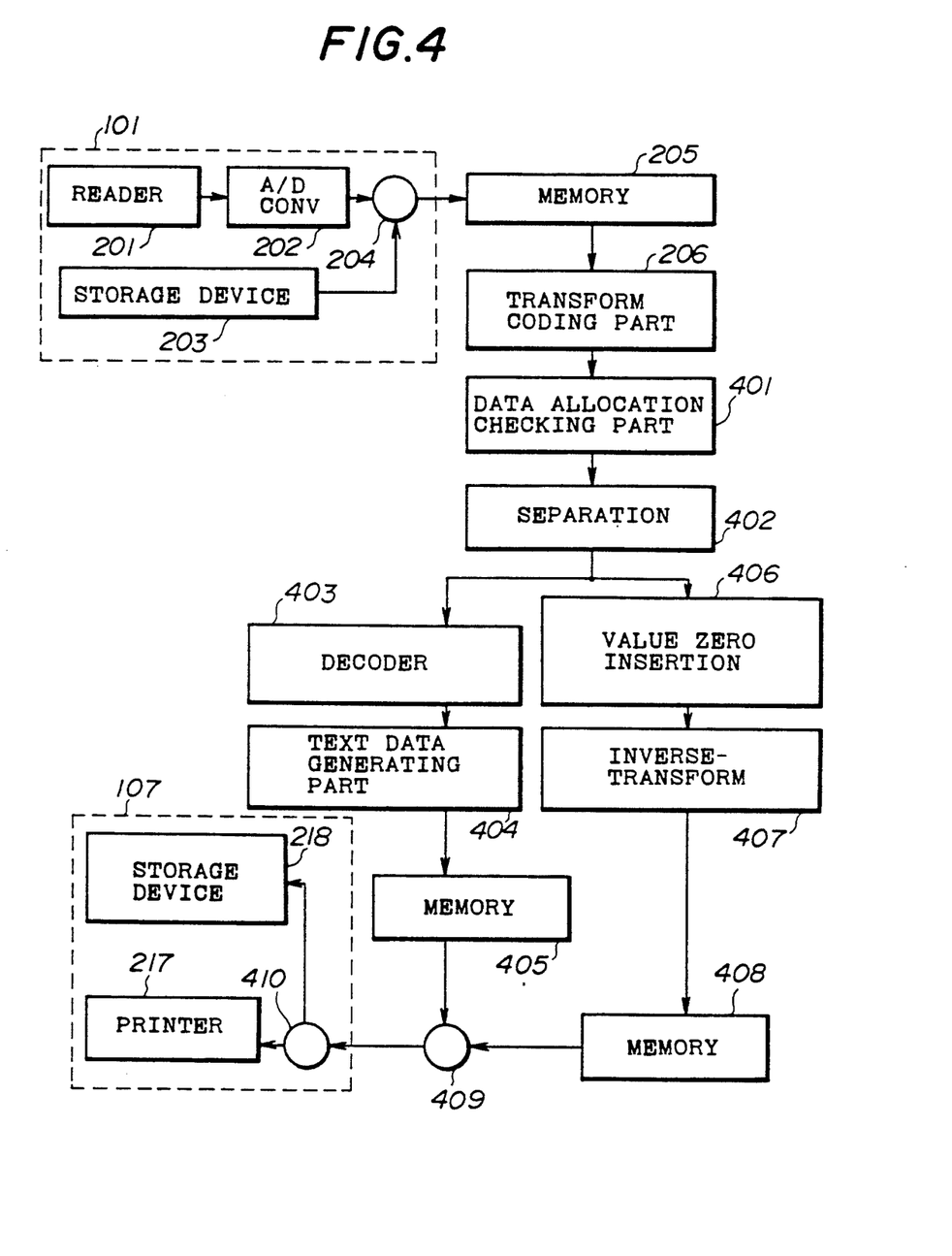
FIG. 4 is a block diagram showing the construction of a data separation part.

Next, a description will be given of the data separation part in the image reproducing apparatus of the invention. FIG. 4 shows a detailed structure of the data separation part. In FIG. 4, this data separation part includes the transform coding part 206, a data allocation checking part 401, and a separation part 402. The data allocation checking part 401 checks allocation data in the matrix of the coded picture elements at a specified block so that the location of the image data in the matrix is detected in the memory 205. As described above, the allocation data indicates the location of the image data in the matrix of the composite image and is already inserted in the coded picture elements at a maximum-frequency block due to the adaptive quantization. The separation part 402 carries out a text/image separation process so that the coded text data is separated from the coded image data with the transform coefficients in the composite image.

In FIG. 4, the data separation part also includes a decoder 403, a text-data generating part 404 and a memory 405, in order for reproducing the text data separately from the image data in the composite image. The decoder 403 converts run-length signals of the coded text data into signals indicating levels corresponding to the run lengths. The text-data generating part 404 generates the text data from the signals supplied by the decoder 403, the coded text data being included in the high-frequency blocks of the matrix indicated by the allocation data. The text data reproduced by the text-data generating part 404 is stored in the memory 405. The data separation part also includes a value-zero insertion part 406, an inverse-transform coding part 407 and a memory 408, in order for reproducing the image data separately from the text data. The value-zero inserting part 406 inserts the value zero into vacant blocks of the composite image data corresponding to the separated text data as the transform coefficients of the image data supplied by the data separation part. The inverse-transform coding part 407 carries out inverse-transform coding based on the transform coefficients of the image data with respect to each of the blocks of the matrix so that the image data is reproduced. The image data reproduced by the inverse-transform coding part 407 is stored in the memory 408 sequentially for each block. A switch part 409 switches connection of the memory 405 storing the text data and the memory 408 storing the image data to the output part 107.

In FIG. 4, the output part 107 includes a switch part 410, the printer 217 and the storage part 218. The switch part 410 switches connection of the data separation part to either the printer 217 or the storage device 218. Thus, the text data and the image data both from the data separation part are separately output to either the printer 217 or the storage device 218.

Figure 5:
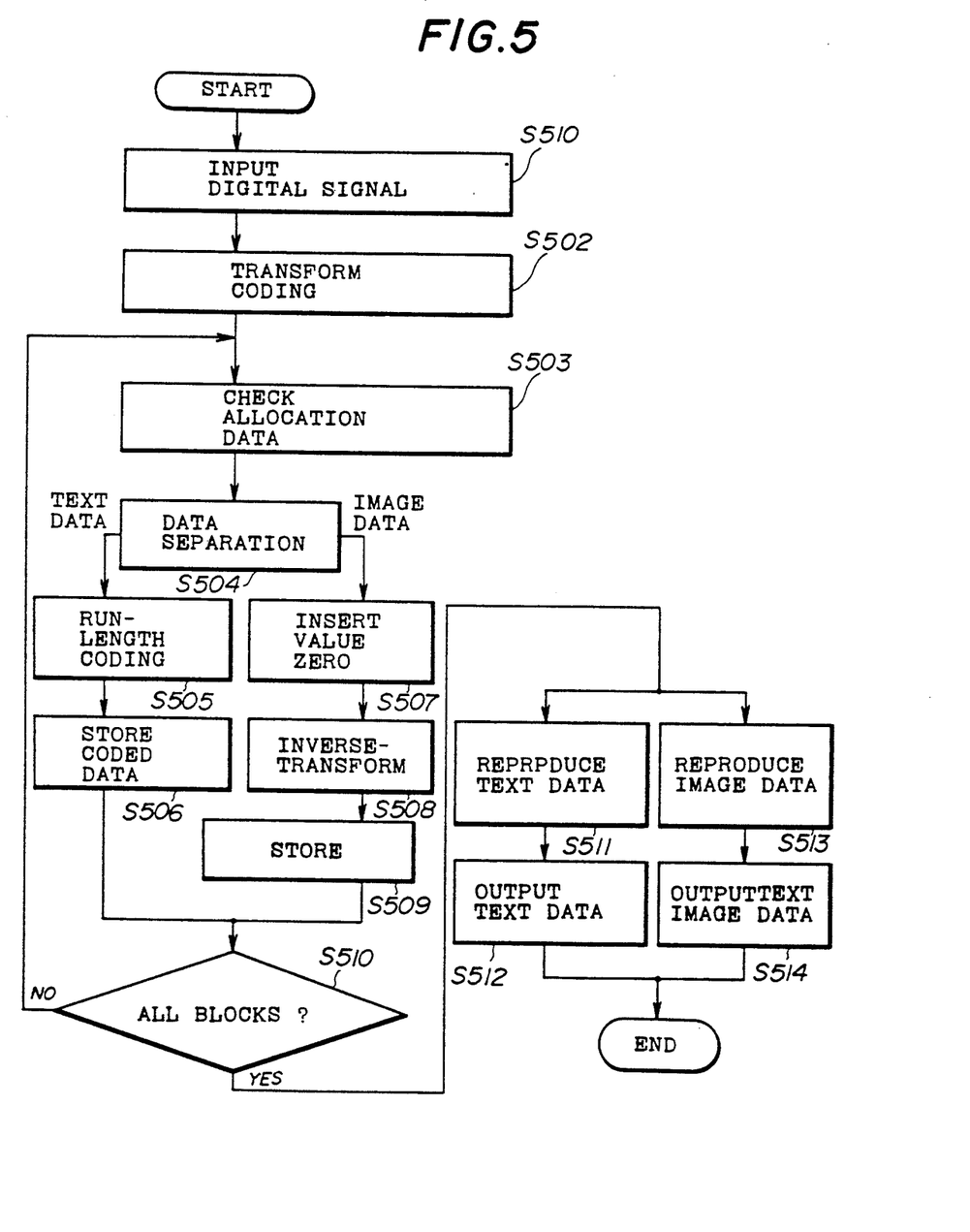
FIG. 5 is a flow chart for explaining a text/image separation process performed by the data separation part.

FIG. 5 shows a text/image separation process performed by the data separation part of FIG. 4. In a flow chart shown in FIG. 5, step S501 inputs digital signals indicating a composite image. The digital signals of the composite image are supplied from the reader 201 and the storage device 203. Each of the digital signals is stored in the memory 205. Step S502 carries out a transform coding process for the input digital signal with respect to each block in the matrix by the transform coding part 206. Step S503 checks allocation data at a specified block of the matrix by the data allocation checking part 401, so that the location of the coded image data in the matrix is detected. Step S504 separates the coded text data from the remaining image data in the coded picture elements by means of the separation part 402.

In step S505, the decoder 403 generates signals indicating levels corresponding to run lengths of the text data from the run-length signals of the text data supplied by the separation part 402. In step S506, the text-data generating part 404 reproduces text data with respect to the block being checked, and the reproduced text data is stored in the memory 405.

In step S507, the value zero is inserted by the part 406 into each of blocks in the matrix of the coded picture elements corresponding to the separated text data, the inserted values being part of the transform coefficients of the image data supplied by the separation part 402. In step S508, the inverse-transform coding part 407 carries out inverse-transform coding based on the transform coefficients of the image data with respect to each of the blocks of the matrix, so that the image data is reproduced for each block. In step S509, the image data of each block supplied by the inverse-transform coding part 407 is stored in the memory 408 for each block sequentially. The above steps S503 to S509 are repeated until both processes are completed for all the blocks of the coded picture elements.

Step S510 checks whether or not both processes of text data and image data are completed for all the blocks of the coded picture elements. After the processes are completed, in step S511, the text data is reproduced by the text-data generating part 404, and the reproduced text data is stored in the memory 405. In step S512, the data in the memory 405 is output to the output part 107 via the switch part 409. Also, in step S513, the image data is reproduced by the inverse-transform coding part 407, and such data is stored in the memory 407. In step S514, the data in the memory 408 is output to the output part 107.

As described above, text data and image data separate from each other can efficiently be reproduced from a composite image. Necessary data can safely and easily be obtained from a small amount of information of the composite image which is compressed at a high compression rate.

Figure 6A:
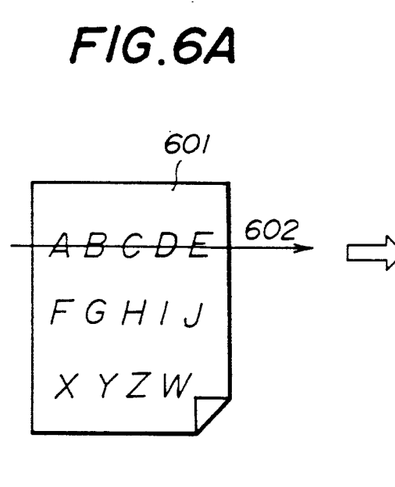
FIGS. 6A and 6B are diagrams for explaining a run-length coding process performed for text data.
Figure 6B:
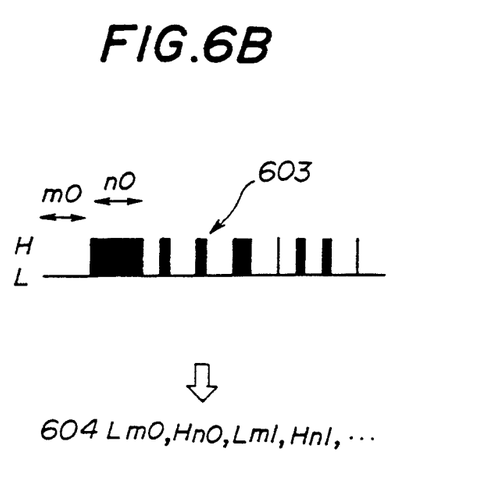

FIGS. 6A and 6B are diagrams for explaining a run-length coding process which is performed for preprocessing of text data for data compression. FIG. 6A shows an image of text data obtained by the reader 201 through raster scanning of a document 601 along scan lines 602 from side to side. This image of the text data is stored in the memory 205. FIG. 6B shows a binary signal 603 indicating coded text data 604 corresponding to a scan line, this signal being produced by the run-length coding part 209 and the coded text data being stored in the memory 210 after a run-length coding process is carried out. The signal 603 of FIG. 6B is generated by raster scanning the image of the text data along a scan line 602 and by the A/D conversion. This signal shows a sequence of low-level portions and high-level portions, the low-level portions each having a length (Lm0, Lm1, Lm2, ... ) and the high-level portions each having a length (Hn0, Hn1, Hn2, ... ). The coded text data 604 is represented by these signal portions in a form as "Lm0,Hn0,Lm1,Hn1, ... ".

Figure 7A:
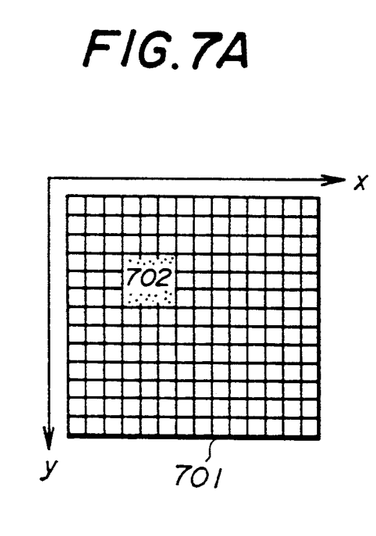
FIGS. 7A and 7B are diagrams for explaining an orthogonal transform coding process performed for image data.
Figure 7B:
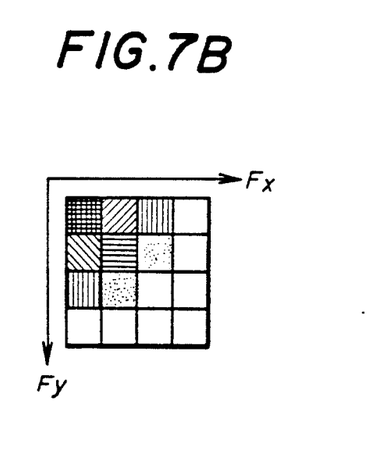

FIGS. 7A and 7B are diagrams for explaining an orthogonal transform coding process which is performed for image data. FIG. 7A shows image data 701 which is described in two-dimensional coordinates (on x-axis and y-axis). FIG. 7B shows a matrix of blocks of coded picture elements which is described by transform coefficients in frequency-dependent regions. The image data 701 is divided into a matrix of blocks of "N×N" picture elements. For example, a block 702 is one of the blocks in the image data 701. According to the present invention, an orthogonal transform coding process is carried with respect to each of the blocks in the image data, so that a matrix of blocks of coded picture elements of FIG. 7B described by transform coefficients along Fx and Fy frequency axes is produced. In the matrix of FIG. 7B, a left-most top block represents a transform coefficient corresponding to a d.c. component of the coded picture elements. High-frequency components thereof appear in low, right-hand blocks in the matrix. A right-most bottom block of the matrix represents a transform coefficient corresponding to a maximum frequency of the coded picture elements in Fx-Fy coordinates.

Figure 8:
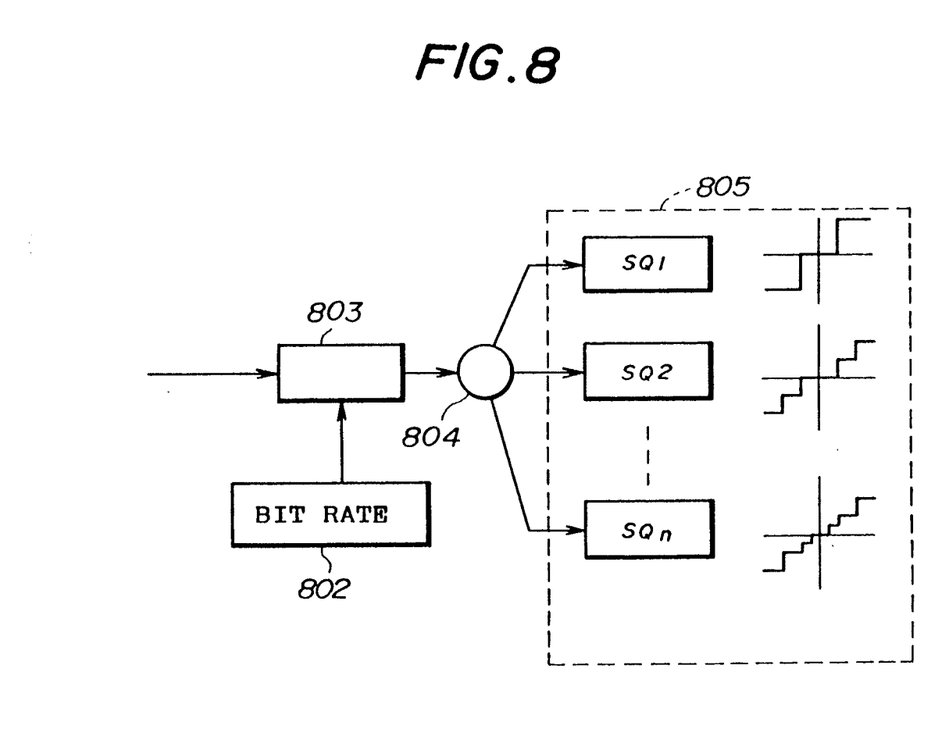
FIG. 8 is a block diagram showing the construction of a quantization part.

FIG. 8 shows the construction of the quantization part 213 in the image reproducing apparatus. In FIG. 8, a block 801 of coded picture elements is supplied from the memory 207 to the quantization part 213, and an adaptive quantization is carried out for this block, in accordance with a suitably assigned bit rate. This bit rate 802 is assigned to the block 801, based on a determined average coding rate and based on the a.c. component of electric power with respect to transform coefficients of this block. A selector 803 is provided to select a quantizer 805 from among a plurality of quantizers SQ1 through SQn having different quantization steps, in accordance with the assigned bit rate, the selected quantizer carrying out adaptive quantization for the block 801. A switch part 804 switches connection of the selector 803 to one of the quantizers SQ1 through SQn. Thus, the quantity of text data being inserted in the composite image is varied for each of the blocks of the matrix of the coded picture elements, and the quantity of data of transform coefficients is optimized so as to suitably vary the text data quantity.

Figure 9:
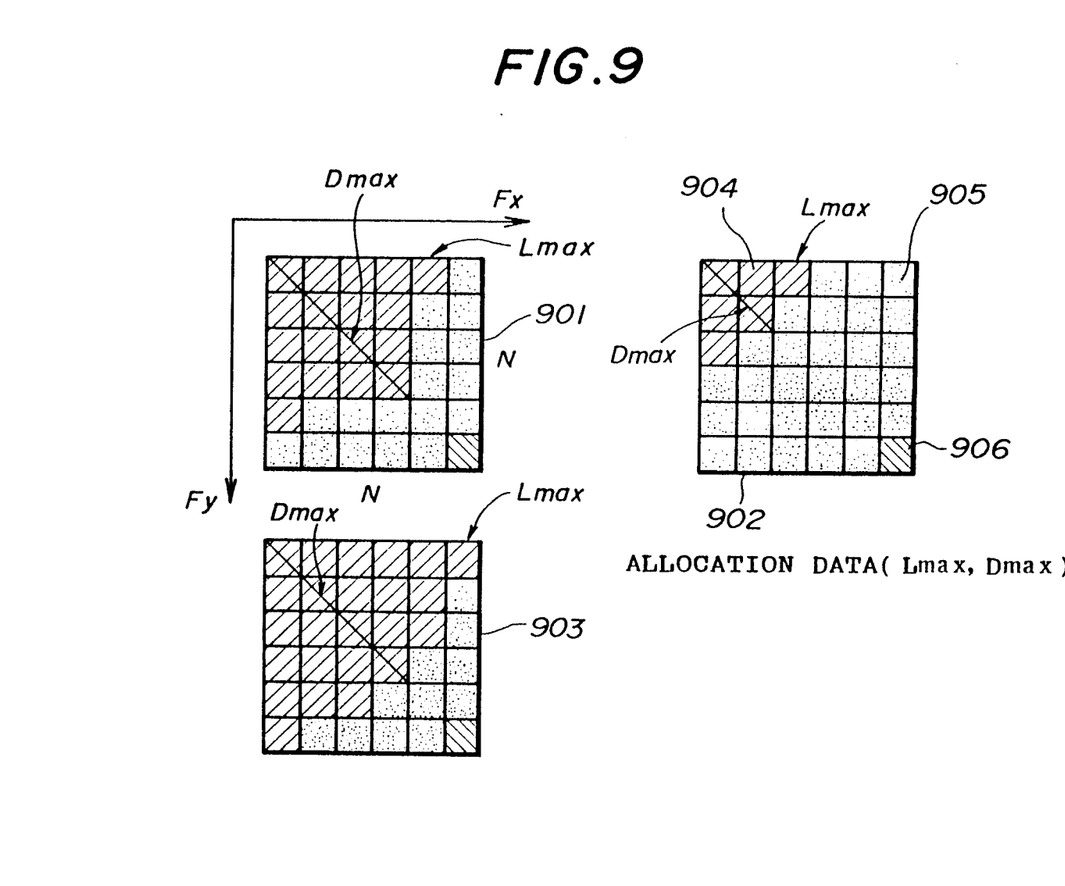
FIG. 9 is a diagram showing the state of composite images generated by a data composition part after adaptive quantization is carried out.

FIG. 9 shows the state of several composite images generated by the data composition part after the adaptive quantization is carried out. In FIG. 9, a matrix of blocks 901 shows a state of a composite image in which image data and text data almost in the same amount are combined together. In FIG. 9, blocks 904 indicated by shading lines and located at low-frequency regions represent transform coefficients of image data, and blocks 905 indicated by small dots and located at high-frequency regions represent transform coefficients of text data. A matrix of blocks 902 indicates a state of a composite image in which a large quantity of supplementary text data is combined with a small amount of image data. In this composite image, the image data blocks usually contain only flat, simple image data such as background components. A matrix of blocks 903 shows a state of a composite image in which a small amount of text data is combined with a great amount of text data. In this composite image, the image data blocks usually contain fine, complex image data such as outline data and have a large quantity of high-frequency components. In FIG. 9, a block 906 shows a maximum-frequency block in the Fx-Fy coordinates in which the allocation data defining a location of image data in the matrix is inserted. Since the maximum frequency component of the actual image data occurs less frequently, a difference is not visually appreciable to human eye if it is replaced by the allocation data. According to the invention, the location of image data in the matrix is defined with a set of a maximum line code Lmax and a maximum diagonal code Dmax, and this allocation data is denoted as (Lmax, Dmax). The maximum line code Lmax is a maximum line number of the coded image data in the matrix and the maximum diagonal code Dmax is a maximum diagonal line length thereof. For example, the allocation data for the matrixes of the composite images 901, 902 and 903 shown in FIG. 9 are represented by (5, 4), (3, 2) and (6, 4), respectively. For the sake of convenience, these allocation data are described with a one-byte hexadecimal code, that is, hex "54" hex "32" and hex "64". Also, the allocation data is inserted by the composition part 214 into the maximum-frequency block of the matrix.

Further, the present invention is not limited to the above described embodiments, and variations and modifications may be made without departing from the scope of the present invention.

What is claimed is:

1. An image reproducing apparatus for generating a composite image from (1) image signals indicative of an image and (2) supplementary signals which are not indicative of the image, said apparatus comprising:
   a) input means for inputting (1) digital signals indicating the image, and (2) supplementary digital signals which are not indicative of the image;
   b) composition means for coding said digital signals through a prescribed coding process so as to generate a matrix of blocks wherein:
      1) coded data described by coefficients produced through said coding process is contained in the matrix of blocks, and
      2) said blocks are arranged in two-dimensional coordinates depending on a level of a frequency corresponding to each of coded digital signals;
   c) first control means for determining a first region of low-frequency blocks in which said coded data corresponding to said digital signals is substantially located within said matrix; and
   d) second control means, including:
      1) means for placing allocation data defining a location of said first region within said matrix into a maximum-frequency block of said matrix, the maximum-frequency block relating to a higher frequency than the low-frequency blocks, and
      2) means for placing data corresponding to said supplementary digital signals into a second region of high-frequency blocks of said matrix.

2. An apparatus according to claim 1, wherein said allocation data and said data corresponding to the supplementary digital signals are placed in said matrix by said second control means after adaptive quantization is carried out with respect to each of the blocks of the matrix.

3. An apparatus according to claim 1, wherein said allocation data is described with a set of a maximum line value and a maximum diagonal length value, both said values being determined by said second control means with respect to the first region of the low-frequency blocks containing the coded data corresponding to the digital signals.

4. An apparatus according to claim 1, further comprising first means for carrying out adaptive quantization for the coded data corresponding to the digital signals in accordance with a bit rate being assigned to each of the low-frequency blocks in the first region, wherein said second control means places the data corresponding to the supplementary digital signals into the high-frequency blocks which are different from the low-frequency blocks containing quantized data corresponding to the digital signals, and further comprising second means for carrying out inverse-transform coding of said quantized data supplied by said first means so as to generate a composite image from the digital signals and the supplementary digital signals.

5. An apparatus according to claim 1, further comprising a transform coding part for carrying out orthogonal transform coding of the digital signals, a run-length coding part for carrying out run-length coding of the supplementary digital signals, wherein said first control means comprises a calculating part for calculating a compression rate required for placing the data corresponding to the supplementary digital signals within the matrix of the blocks based on a detected quantity of the data corresponding to the supplementary digital signals and based on a detected quantity of the coded data corresponding to the digital signals.

6. An image reproducing apparatus for separating an image from a composite image containing (1) image data which is indicative of the image and (2) supplementary data which is not indicative of the image, said apparatus comprising:
   a) input means for inputting a matrix of blocks corresponding to said composite image, wherein:
      1) said matrix of blocks contains coded data described by coefficients produced through a prescribed coding process, and
      2) said blocks are arranged in two-dimensional coordinates depending on a level of a frequency of each of coded data corresponding to said composite image;
   b) first transform means for detecting a location of a second region of low-frequency blocks in which coded data corresponding to said supplementary data which is not indicative of the image is located within said matrix by checking allocation data at a maximum-frequency block of said matrix, the maximum-frequency block relating to a higher frequency than the low-frequency blocks;
   c) separation means for separating said matrix of said blocks, in accordance with said detected location of said second region, into:
      1) a first region of high-frequency blocks in which coded data corresponding to image data in said composite image is located, and
      2) said second region in which the coded data corresponding to the supplementary data is located; and
   d) second transform means for carrying out inverse transform coding of the coded data corresponding to the image data, said coded data located in said first region of said matrix, so as to output an image of the resulting image data separately from said composite image.

7. An apparatus according to claim 6, further comprising means for decoding the coded data included in the first region supplied by said separation means so that an original image of the supplementary data is reproduced.

8. An apparatus according to claim 6, further comprising:
   second input means for inputting digital signals indicating an image and inputting supplementary digital signals;
   composition means for coding said digital signals through a prescribed coding process so as to generate a matrix of blocks in which coded data described by coefficients produced through said coding process is contained, said blocks being arranged in two-dimensional coordinates depending on a level of a frequency corresponding to each of coded digital signals;
   first control means for determining a first region of low-frequency blocks in which said coded data corresponding to said digital signals is substantially located within said matrix; and
   second control means for placing allocation data defining a location of said first region within said matrix into a maximum-frequency block of said matrix, and for placing data corresponding to said supplementary digital signals into a second region of high-frequency blocks of said matrix.

9. An apparatus according to claim 8, further comprising switching means for selecting a contact point between a first point and a second point, wherein a data composition process is carried out so as to generate a composite image having supplementary data when the first point is selected by said switching means, and when the second point is selected by said switching means a data separation process is carried out so as to generate an image having no supplementary data from a composite image.

10. An apparatus according to claim 8, further comprising first means for carrying out adaptive quantization for the coded data corresponding to the digital signals in accordance with a bit rate being assigned to each of the low-frequency blocks in the first region, wherein said second control means places the data corresponding to the supplementary digital signals into the high-frequency blocks which are different from the low-frequency blocks containing quantized data corresponding to the digital signals, and further comprising second means for carrying out inverse-transform coding of said quantized data supplied by said first means so as to generate a composite image from the digital signals and the supplementary digital signals.

11. An apparatus according to claim 8, further comprising a transform coding part for carrying out orthogonal transform coding of the digital signals, a run-length coding part for carrying out run-length coding of the supplementary digital signals, wherein said first control means comprises a calculating part for calculating a compression rate required for placing the data corresponding to the supplementary digital signals within the matrix of the blocks based on a detected quantity of the data corresponding to the supplementary digital signals and based on a detected quantity of the coded data corresponding to the digital signals.

12. An image reproducing apparatus for reproducing a composite image from (1) halftone image signals which are indicative of a halftone image and (2) supplementary signals which are not indicative of the halftone image, said image reproducing apparatus comprising:
   a) input means for inputting (1) digital signals indicating the halftone image and (2) supplementary digital signals which are not indicative of the halftone image;
   b) switching means, coupled to said input means, for selecting, in response to an instruction supplied from an operation part, one of (1) a data composition mode and (2) a data separation mode;
   c) transform coding means, coupled to said switching means, for subjecting said digital signals supplied from said input means to an orthogonal transform coding process to generate a matrix of blocks in which coded data described by coefficients produced by said orthogonal transform coding process is arranged according to a level of frequency corresponding to each of the coded digital signals;
   d) second coding means, coupled to said switching means, for subjecting said supplementary digital signals from said input means to a run-length coding process to generate coded data corresponding to the supplementary digital signals;
   e) data composition means for generating composite image data when the data composition mode is selected by said switching means, the generating of the composite image data being based on:

1) the coded data supplied from the transform coding means, and
2) the coded data supplied from said second coding means;

f) means for subjecting said composite image data supplied from said data composition means to an orthogonal inverse-transform coding process to reproduce the composite image, and for storing the composite image in a memory device; and g) output means for outputting the composite image stored in the memory device.

13. The apparatus of claim 12, wherein said data composition means includes:

a) first control means, coupled to said transform coding means, for placing said coded data corresponding to the digital signals into a first region of low-frequency blocks within said matrix of blocks;

b) second control means, coupled to said second coding means, and including:
1) means for placing said coded data corresponding to the supplementary digital signals into a second region of high-frequency blocks within said matrix of blocks, the high-frequency blocks relating to higher frequencies than the low-frequency blocks, and
2) means for placing allocation data indicating a location of said first region within said matrix into a highest-frequency block of said matrix, the highest-frequency block relating to a higher frequency than the low-frequency blocks; and c) means for subjecting said coded data corresponding to said digital signals to an adaptive quantization process so as to place quantized data in the low-frequency blocks of the first region of the matrix; wherein said adaptive quantization process is performed according to a bit rate assigned to each of the low-frequency blocks in the first region of the matrix.

14. An image reproducing apparatus for separating an image from a composite image containing (1) image data describing the image and (2) supplementary data which does not describe the image, said apparatus comprising:

a) input means for inputting digital signals indicating the composite image containing supplementary data;

b) switching means, coupled to said input means, for selecting, in response to an instruction supplied from an operation part, one of (1) a data composition mode and (2) a data separation mode;

c) transform coding means, coupled to said switching means, for subjecting said digital signals supplied from said input means to an orthogonal transform coding process to generate a matrix of blocks corresponding to said composite image; wherein coded data described by coefficients produced by said orthogonal transform coding process is arranged in two-dimensional coordinates according to the level of frequency that corresponds to each of the coded digital signals;

d) data separation means for separating said matrix of blocks supplied from said transform coding means when the data separation mode is selected by said switching means, the matrix of blocks being separated into:
1) a first region of low-frequency blocks in which coded data relating to said supplementary data is arranged within said matrix, and
2) a second region of high-frequency blocks in which coded data relating to halftone image data of said composite image is arranged, the high-frequency blocks corresponding to higher frequencies than the low-frequency blocks;

e) means for subjecting said coded data relating to said halftone image data supplied from said data separation means to an orthogonal inverse-transform coding process so as to reproduce an image, and for storing said image in a first memory device;

f) means for subjecting said coded data relating to said supplementary data supplied from said data separation means to a decoding process so as to reproduce an original image of the supplementary data, and for storing said original image in a second memory device; and g) output means for outputting said image stored in the first memory device and said original image stored in the second memory device.

15. The apparatus of claim 14, wherein said data separation means includes:

a) means for reading allocation data from said matrix of blocks supplied by said transform coding means; and b) means for detecting a location of the first region of low-frequency blocks within said matrix;

wherein:
1) said allocation data is arranged at a highest-frequency block of said matrix which relates to higher frequencies than the low-frequency blocks, and
2) the coded data relating to the supplementary data is arranged in the first region of low-frequency blocks of said matrix.

16. The apparatus of claim 14, further comprising an image reproducing apparatus for reproducing a composite image from (1) halftone image signals which are indicative of a halftone image and (2) supplementary signals which are not indicative of the halftone image, said image reproducing apparatus including:

a) input means for inputting (1) digital signals indicating the halftone image and (2) supplementary digital signals which are not indicative of the halftone image;

b) transform coding means, coupled to said switching means, for subjecting said digital signals supplied from said input means to an orthogonal transform coding process to generate a matrix of blocks in which coded data described by coefficients produced by said orthogonal transform coding process is arranged according to a level of frequency corresponding to each of the coded digital signals;

c) second coding means, coupled to said switching means, for subjecting said supplementary digital signals from said input means to a run-length coding process to generate coded data corresponding to the supplementary digital signals;

d) data composition means for generating composite image data when the data composition mode is selected by said switching means, the generating of the composite image data being based on:
1) the coded data supplied from the transform coding means, and
2) the coded data supplied from said second coding means;

e) means for subjecting said composite image data supplied from said data composition means to an orthogonal inverse-transform coding process to reproduce the composite image, and for storing the composite image in a memory device; and f) output means for outputting the composite image stored in the memory device.

17. The apparatus of claim 15, further comprising:

a) first control means, coupled to said transform coding means, for placing said coded data corresponding to the digital signals into a first region of low-frequency blocks within said matrix of blocks;

b) second control means, coupled to said second coding means, and including:
 1) means for placing said coded data corresponding to the supplementary digital signals into a second region of high-frequency blocks within said matrix of blocks, the high-frequency blocks relating to higher frequencies than the low-frequency blocks, and
 2) means for placing allocation data indicating a location of said first region within said matrix into a highest-frequency block of said matrix, the highest-frequency block relating to higher frequencies than the low-frequency blocks; and c) means for subjecting said coded data corresponding to said digital signals to an adaptive quantization process so as to place quantized data in the low-frequency blocks of the first region of the matrix; wherein said adaptive quantization process is performed according to a bit rate assigned to each of the low-frequency blocks in the first region of the matrix.

* * * * *